US012602167B2

(12) United States Patent
Tang et al.

(10) Patent No.: US 12,602,167 B2
(45) Date of Patent: Apr. 14, 2026

(54) DATA PROCESSING METHOD AND APPARATUS, DEVICE, AND READABLE STORAGE MEDIUM

(71) Applicant: DapuStor Corporation, Shenzhen (CN)

(72) Inventors: Xiaodong Tang, Shenzhen (CN); Xiang Chen, Shenzhen (CN)

(73) Assignee: DAPUSTOR CORPORATION, Shenzhen (CN)

( * ) Notice: Subject to any disclaimer, the term of this patent is extended or adjusted under 35 U.S.C. 154(b) by 47 days.

(21) Appl. No.: 18/407,611

(22) Filed: Jan. 9, 2024

(65) Prior Publication Data

US 2024/0143188 A1    May 2, 2024

Related U.S. Application Data

(63) Continuation of application No. PCT/CN2022/097620, filed on Jun. 8, 2022.

(30) Foreign Application Priority Data

Jul. 9, 2021    (CN) .......................... 202110779968.9

(51) Int. Cl.
*G06F 3/06* (2006.01)

(52) U.S. Cl.
CPC ............ *G06F 3/0616* (2013.01); *G06F 3/064* (2013.01); *G06F 3/0679* (2013.01)

(58) Field of Classification Search
CPC ...... G06F 3/0616; G06F 3/064; G06F 3/0679; G06F 3/0619; G06F 3/0659; G06F 3/061; G06F 3/0688; G06F 11/07; G06F 3/0614

(Continued)

(56) References Cited

U.S. PATENT DOCUMENTS 10,565,040 B2 * 2/2020 Ryabinin ................... G06F 1/32
10,817,372 B2 * 10/2020 Chen ...................... G11C 29/52
(Continued)

FOREIGN PATENT DOCUMENTS

CN          103984607 A       8/2014
CN          111400083 A       7/2020
(Continued)

OTHER PUBLICATIONS

International Search Report and Written Opinion in related PCT Application No. PCT/CN2022/097620 dated Aug. 31, 2022 (9 pages).

*Primary Examiner* — James C Kerveros
(74) *Attorney, Agent, or Firm* — Bayes PLLC

(57) ABSTRACT

A data processing method, a device, and a readable storage medium are disclosed. The data processing method includes: receiving target data sent by a host and writing the target data into a memory; determining, when the target data occupies n memory nodes in the memory, the n memory nodes as n data nodes; computing check data of the target data by using an EC algorithm engine, storing the check data by using m memory nodes, determining the m memory nodes as m check nodes, wherein values of n and m are preset in EC attributes of a current solid state disk; determining a currently available data block group and querying an arrangement sequence of n user data blocks and m check data blocks in the data block group; and arranging the n data nodes and the m check nodes into a linked list according to the arrangement sequence.

20 Claims, 6 Drawing Sheets

(58) Field of Classification Search
USPC ........................................................ 714/746
See application file for complete search history.

(56) References Cited

U.S. PATENT DOCUMENTS

| | | | |
|---|---|---|---|
| 11,625,173 B1 * | 4/2023 | Therene .............. | G06F 12/0804 |
| | | | 714/764 |
| 11,789,814 B2 * | 10/2023 | Li ....................... | G06F 11/1068 |
| | | | 714/764 |
| 2014/0149820 A1 * | 5/2014 | Anholt .............. | H03M 13/1105 |
| | | | 714/758 |
| 2018/0150351 A1 * | 5/2018 | Li ........................... | G06F 3/067 |
| 2019/0081639 A1 * | 3/2019 | Hanham ............ | H03M 13/1108 |
| 2020/0174708 A1 | 6/2020 | Liu et al. | |
| 2021/0334160 A1 * | 10/2021 | Mishra ................ | H03M 13/154 |
| 2021/0359704 A1 * | 11/2021 | Chen ................... | G06F 11/1004 |
| 2024/0106461 A1 * | 3/2024 | Oboukhov .......... | H03M 13/618 |

FOREIGN PATENT DOCUMENTS

| | | |
|---|---|---|
| CN | 111818124 A | 10/2020 |
| CN | 113419684 A | 9/2021 |
| WO | 2018028107 A | 2/2018 |

* cited by examiner

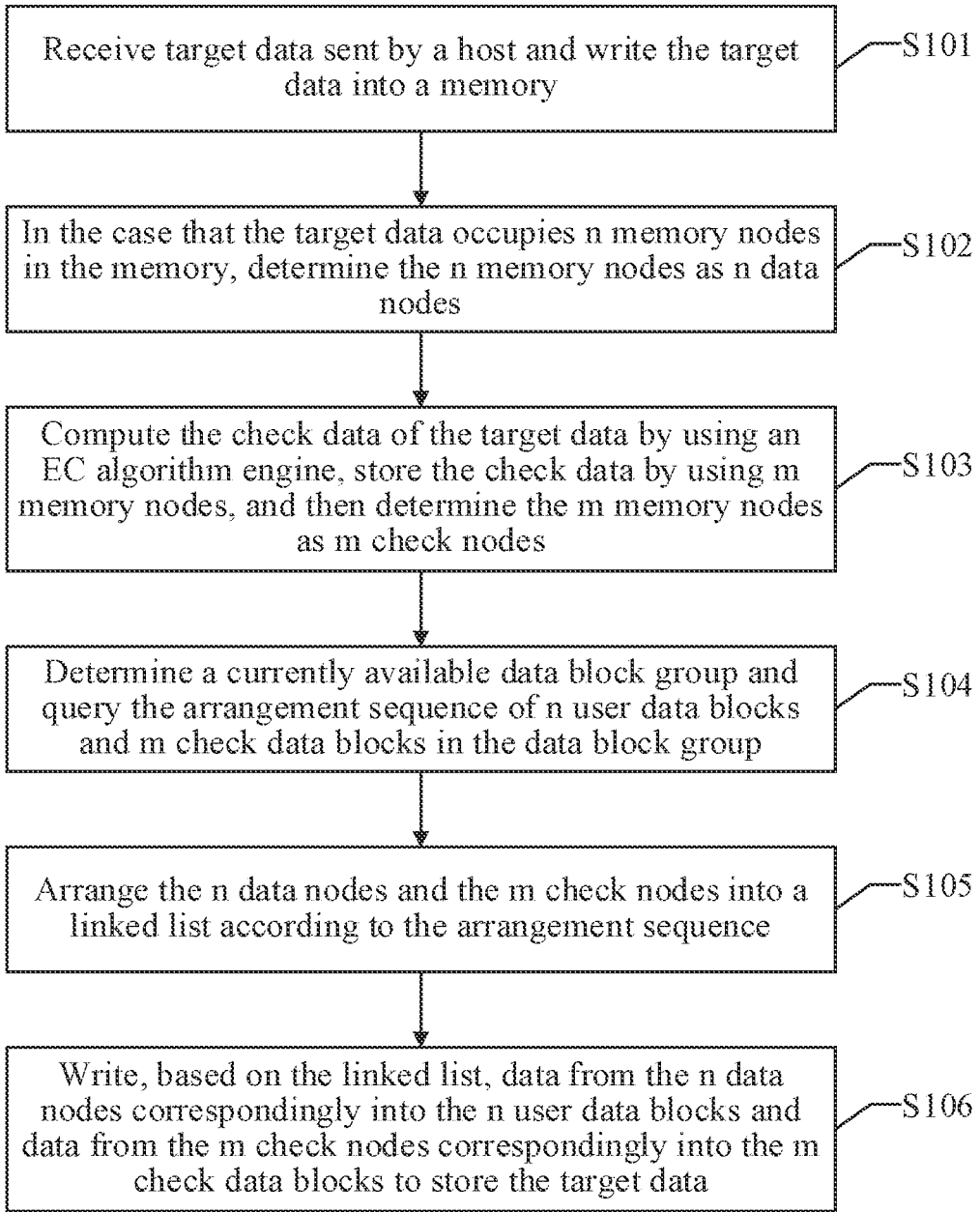

Receive target data sent by a host and write the target data into a memory — S101

In the case that the target data occupies n memory nodes in the memory, determine the n memory nodes as n data nodes — S102

Compute the check data of the target data by using an EC algorithm engine, store the check data by using m memory nodes, and then determine the m memory nodes as m check nodes — S103

Determine a currently available data block group and query the arrangement sequence of n user data blocks and m check data blocks in the data block group — S104

Arrange the n data nodes and the m check nodes into a linked list according to the arrangement sequence — S105

Write, based on the linked list, data from the n data nodes correspondingly into the n user data blocks and data from the m check nodes correspondingly into the m check data blocks to store the target data — S106

FIG. 1 block group

| D0B0 | D1B1 | D2B2 | D3B3 | D4B8 | ... | D31B6 | block group

| D12B0 | D15B1 | D2B2 | D5B3 | D6B8 | ... | D4B8 |

DATA PROCESSING METHOD AND APPARATUS, DEVICE, AND READABLE STORAGE MEDIUM

CROSS-REFERENCE TO RELATED APPLICATIONS

The present application is a continuation of International Application No. PCT/CN2022/097620, filed on Jun. 8, 2022, which claims the benefit of priority to Chinese Patent Application No. 202110779968.9 filed on Jul. 9, 2021. The entire contents of each of the above-referenced applications are expressly incorporated herein by reference.

TECHNICAL FIELD

The present disclosure relates to the technical field of computers, and in particular to a data processing method and apparatus, a device, and a readable storage medium.

BACKGROUND

Currently, commonly used methods for data reliability protection can only tolerate up to two DIE faults within a storage disk. If more DIE faults occur, data recovery becomes impossible, leading to a higher risk of data loss. Commonly used methods for data reliability protection include XOR algorithms, redundant arrays of independent disks (RAID) 5, RAID6, etc. The XOR algorithm and RAID5 can only tolerate one DIE fault within the disk, and RAID6 can only tolerate two DIE faults within the disk. DIE, also known as LUN, is a technical term in NAND flash. DIE/LUN represents the basic unit for receiving and executing flash commands.

Currently, as disk storage capacity increases, the number of DIEs in a disk increases, and the probability of DIE fault also increases accordingly. Once one or two DIE faults occur, data recovery is required, which consumes a significant amount of storage computing power. It is evident that the existing methods for data reliability protection lack flexibility. When used to safeguard large-capacity storage disks, they can easily lead to data loss. Moreover, the frequent execution of data recovery processes tends to consume a significant amount of storage computing power.

Therefore, achieving data reliability protection for large-capacity storage disks is a challenge that those skilled in the art need to address.

SUMMARY

In view of this, the aim of the present disclosure is to provide a data processing method and apparatus, a device, and a readable storage medium for ensuring data reliability in large-capacity storage disks.

In a first aspect, the present disclosure provides a data processing method applicable to a solid state disk, comprising:

receiving target data sent by a host and writing the target data into a memory;

determining, in a case that the target data occupies n memory nodes in the memory, the n memory nodes as n data nodes;

computing check data of the target data by using an EC algorithm engine, storing the check data by using m memory nodes, and then determining the m memory nodes as m check nodes, wherein values of n and m are preset in EC attributes of a current solid state disk;

determining a currently available data block group and querying an arrangement sequence of n user data blocks and m check data blocks in the data block group;

arranging the n data nodes and the m check nodes into a linked list according to the arrangement sequence; and writing, based on the linked list, data from the n data nodes correspondingly into the n user data blocks and data from the m check nodes correspondingly into the m check data blocks to store the target data.

In some embodiments, computing the check data for the target data by using the EC algorithm engine and storing the check data by using the m memory nodes, comprises:

requesting the m memory nodes from the memory;

transferring the n data nodes and the m memory nodes to the EC algorithm engine to allow the EC algorithm engine to compute the check data based on the n data nodes and write the check data into the m memory nodes; or transferring the n data nodes to the EC algorithm engine to allow the EC algorithm engine to compute the check data based on the n data nodes, request the m memory nodes from the memory, and then write the check data into the m memory nodes.

In some embodiments, arranging the n data nodes and the m check nodes into the linked list according to the arrangement sequence, comprises:

arranging the m check nodes at the end of the n data nodes to obtain the linked list.

In some embodiments, after storing the target data, the method further comprises:

updating an L2P mapping table and releasing the n data nodes and the m check nodes.

In some embodiments, the method further comprises:

performing, in a case that data writing fails in any node within the linked list, the step of determining a currently available data block group.

In some embodiments, determining a currently available data block group comprises:

calculating, in a case that there is no currently available data block group, a sum of n and m to obtain a target value;

selecting, in a case that the target value is equal to a number of DIEs in the current solid state disk, one data block from each DIE in the current solid state disk, or selecting, in a case that the target value is fewer than the number of DIEs in the current solid state disk, the target value number of DIEs in the current solid state disk and one data block from each of the selected DIEs; and marking n user data blocks and m check data blocks in the target value number of data blocks, and determining an arrangement sequence of the n user data blocks and the m check data blocks to obtain a currently available data block group.

In some embodiments, marking the n user data blocks and the m check data blocks in the target value number of data blocks, comprises:

randomly selecting m data blocks in the target value number of data blocks to mark the m data blocks as the check data blocks, and marking the remaining n data blocks as the user data blocks.

In some embodiments, marking the n user data blocks and the m check data blocks in the target value number of data blocks, comprises:

randomly arranging the target value number of data blocks based on identification information of the DIE to which each data block belongs to obtain a target sequence; and marking m consecutive data blocks in the target sequence as the check data blocks, and marking the remaining n data blocks as the user data blocks.

In some embodiments, the method further comprises:

performing, in a case that there is a currently available data block group, the step of querying an arrangement sequence of n user data blocks and m check data blocks in the data block group.

In some embodiments, the method further comprises:

waiting, in a case that the target data occupies fewer than n memory nodes in the memory, to receive new data sent by the host, so as to supplement the target data with the new data and ensure the target data occupies n memory nodes in the memory.

In some embodiments, the method further comprises:

supplementing, in a case that waiting for the new data times out, the target data with all-zero data to ensure the target data occupies n memory nodes in the memory, and performing the step of determining the n memory nodes as n data nodes.

In some embodiments, a process of configuring the EC attributes of the current solid state disk comprises:

receiving a command sent by the host to configure the EC attributes;

parsing the command to obtain a target value and m, wherein the target value is a sum of n and m;

recording, in a case that the target value is not greater than a number of DIEs in the current solid state disk, a difference between the target value and m as n; and transferring n and m to the EC algorithm engine to allow the EC algorithm engine to determine an encoding matrix based on n and m to configure the EC attributes of the current solid state disk.

In some embodiments, the method further comprises:

returning, in a case that the target value is greater than the number of DIEs in the current solid state disk, a notification message that the EC attribute configuration has failed.

In some embodiments, the method further comprises:

querying, in a case that a first read of the target data fails, the data block group;

selecting n data blocks which can be read properly from the data block group to form a recoverable combination without repetitions;

reading data from each data block in the recoverable combination, and transferring the read data to the EC algorithm engine to allow the EC algorithm to decode the read data to obtain a decoding result;

checking the decoding result, and reading, in a case that the check is successful, the target data based on the decoding result, otherwise, performing the step of selecting n data blocks which can be read properly from the data block group to form a recoverable combination without repetitions; and returning, in a case that a recoverable combination without repetitions cannot be selected from the data block group, a notification message that the target data reading has failed.

In a second aspect, the present disclosure provides a data processing apparatus applicable to a solid state disk, comprising:

a cache module configured to receive target data sent by a host and write the target data into a memory;

a data node determining module configured to determine, in a case that the target data occupies n memory nodes in the memory, the n memory nodes as n data nodes;

a check node determining module configured to compute check data of the target data by using an EC algorithm engine, store the check data by using m memory nodes, and then determine the m memory nodes as m check nodes, wherein values of n and m are preset in EC attributes of a current solid state disk;

a data block group querying module configured to determine a currently available data block group and query an arrangement sequence of n user data blocks and m check data blocks in the data block group;

an arrangement module configured to arrange the n data nodes and the m check nodes into a linked list according to the arrangement sequence; and a storage module configured to write, based on the linked list, data from the n data nodes correspondingly into the n user data blocks and data from the m check nodes correspondingly into the m check data blocks to store the target data.

In a third aspect, the present disclosure provides an electronic device, comprising:

a memory device configured to store computer programs; and a processor configured to run the computer programs to implement the data processing method disclosed above.

In a fourth aspect, the present disclosure provides a readable storage medium for storing computer programs, wherein the computer programs, when run by a processor, cause the processor to implement the data processing method disclosed above.

According to the above solutions, the present disclosure provides a data processing method applicable to a solid state disk, comprising: receiving target data sent by a host and writing the target data into a memory; determining, in a case that the target data occupies n memory nodes in the memory, the n memory nodes as n data nodes; computing check data of the target data by using an EC algorithm engine, storing the check data by using m memory nodes, and then determining the m memory nodes as m check nodes, wherein values of n and m are preset in EC attributes of a current solid state disk; determining a currently available data block group and querying an arrangement sequence of n user data blocks and m check data blocks in the data block group; arranging the n data nodes and the m check nodes into a linked list according to the arrangement sequence; and writing, based on the linked list, data from the n data nodes correspondingly into the n user data blocks and data from the m check nodes correspondingly into the m check data blocks to store the target data.

It is evident that in the present disclosure, the EC algorithm is used for data reliability protection in solid state disks. Since the number of check data blocks (m) in the EC algorithm is configurable, the present disclosure can tolerate 1, 2, 3, or even more DIE faults in the disk, so that data is not easily lost. This approach offers sufficient flexibility and is suitable for protecting large-capacity storage disks. Moreover, in the present disclosure, the data is correspondingly flushed into the disk according to the arrangement sequence of n user data blocks and m check data blocks in the currently available data block group. This can ensure the randomness of the check data across the disk, that is, make it possible for each DIE in the disk to store the check data, thus further protecting data from being lost.

Accordingly, the data processing apparatus, the device, and the readable storage medium provided according to the present disclosure also possess the above technical effects.

BRIEF DESCRIPTION OF DRAWINGS

In order to more clearly illustrate the technical solutions in the embodiments of the present disclosure or in the prior art, the drawings used in the description of the embodiments or the prior art are briefly introduced below. It is obvious that the drawings in the description below are merely embodiments of the present disclosure, and those of ordinary skilled in the art can obtain other drawings according to the drawings provided without creative efforts.

FIG. 1 is a flowchart of a data processing method disclosed in the present disclosure;

DETAILED DESCRIPTION

Figure 2:
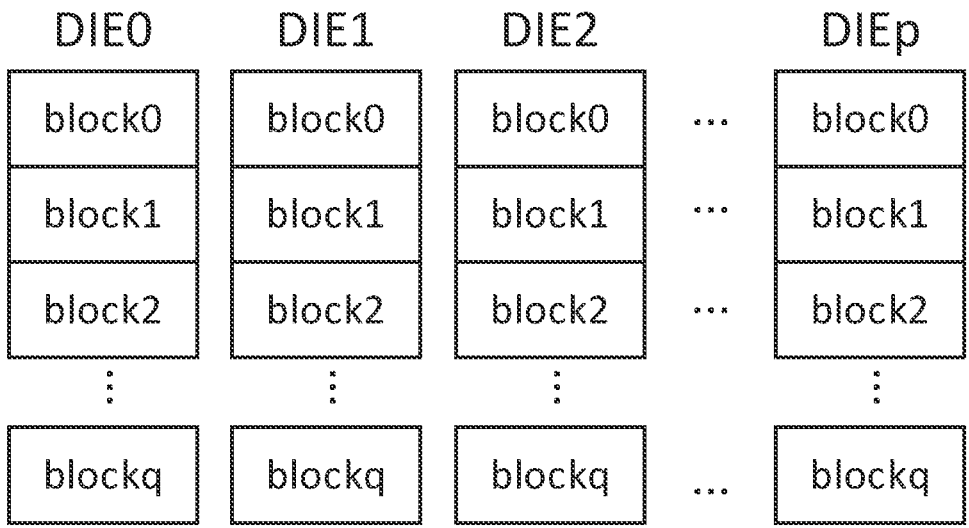
FIG. 2 is a schematic diagram of the composition structure of a solid state disk disclosed in the present disclosure.

The technical solutions in the embodiments of the present disclosure will be described below with reference to the drawings in the embodiments of the present disclosure. Apparently, the described embodiments are only a part of the embodiments of the present disclosure, but not all of them. Based on the embodiments in the present disclosure, all other embodiments obtained by those of ordinary skill in the art without creative work shall fall within the protection scope of the present disclosure.

Currently, the existing methods for data reliability protection lack flexibility. When used to protect large-capacity storage disks, they can easily lead to data loss. Moreover, the frequent execution of data recovery processes tends to consume a significant amount of storage computing power. Therefore, the present disclosure provides a data processing solution that enables data reliability protection for large-capacity storage disks.

Referring to FIG. 1, embodiments of the present disclosure disclose a data processing method applicable to a solid state disk. The data processing method comprises the following steps:

S101, receive target data sent by a host and write the target data into a memory.

Generally, the memory consists of multiple memory nodes, and the size of a memory node represents the minimum unit for data writing as required by the solid state disk (SSD). Hence, when writing target data into a memory, it is written according to the size of the memory nodes. The size of a memory node corresponds to the size of a page.

S102, in the case that the target data occupies n memory nodes in the memory, determine the n memory nodes as n data nodes.

S103, compute the check data of the target data by using an EC algorithm engine, store the check data by using m memory nodes, and then determine the m memory nodes as m check nodes.

The values of n and m are preset in the EC attributes of the current solid state disk.

The EC (erasure code) algorithm is a flexible and configurable encoding and decoding algorithm. It allows the setting of the number of check data blocks based on different business scenarios and configures the corresponding encoding matrix accordingly. In the data writing process, the encoding matrix is multiplied by the data vector to complete the encoding. In case of errors during reading, by taking the inverse of the encoding matrix, multiplying it by the vector consisting of the valid data and the check data, the original data can be obtained, thereby completing the data recovery.

In the embodiments, the memory nodes used to store the data sent by the host are referred to as data nodes, while the memory nodes used to store the check data are referred to as check nodes. That is, both data nodes and check nodes are memory nodes in the memory. The distinction is that the memory nodes storing data sent by the host are referred to as data nodes, whereas the memory nodes storing the check data are referred to as check nodes.

S104, determine a currently available data block group and query the arrangement sequence of n user data blocks and m check data blocks in the data block group.

It should be noted that a data block group comprises n+m data blocks, that is, n user data blocks and m check data blocks. The n+m data blocks belong to different DIEs in the solid state disk.

The composition structure of a solid state disk can be referred to in FIG. 2. A solid state disk can comprise a plurality of DIEs, such as DIE0 to DIEp as shown in FIG. 2. Each DIE comprises a plurality of data blocks, such as block0 to blockq belonging to DIE0. Each data block comprises a plurality of pages.

Referring to FIG. 2, block0 from each DIE may be selected to form a data block group, which comprises: DIE0-block0, DIE1-block0, . . . , and DIEp-block0, totaling p+1 data blocks. Apparently, it is also possible to select fewer than p+1 DIEs from the p+1 DIEs, and then select one data block from each of the selected DIEs to form a data block group. It is evident that the sum of n and m is not greater than the number of DIEs in the disk, i.e., $n+m \leq p+1$.

As for which data blocks in the data block group are used as user data blocks and which data blocks are used as check data blocks, this depends on the values of n and m, as well as the position of the check data blocks. User data blocks are used to store the data sent by the host, and check data blocks are used to store check data.

The values of n and m are preset in the EC attributes of the current solid state disk, while the position of check data blocks is required to be as random as possible to ensure that each DIE has the potential to store check data. In order to make the positions of the check data blocks as random as possible, m data blocks may be randomly selected from 'DIE0-block0, DIE1-block0, . . . , DIEp-block0' as check data blocks. After the selection, the positions of the check data blocks are recorded as metadata.

Generally, to ensure the randomness of the check data block positions while facilitating the determination of the positions, all data blocks in a data block group may be randomly arranged to obtain a corresponding sequence; then, the last m data blocks in the sequence, the first m data blocks in the sequence, or m consecutive data blocks in the middle of the sequence may be specified as the check data blocks. In this way, the following can be achieved: The positions of the check data blocks remain consistent across different data block groups, but in fact, the check data blocks in different data block groups are distributed across different DIEs.

S105, arrange the n data nodes and the m check nodes into a linked list according to the arrangement sequence.

S106, write, based on the linked list, data from the n data nodes correspondingly into the n user data blocks and data from the m check nodes correspondingly into the m check data blocks to store the target data.

In the embodiments, arranging n data nodes and m check nodes into a linked list according to the arrangement sequence aims to align the n data nodes and m check nodes with the n user data blocks and m check data blocks in the currently available data block group, thereby flushing the data into a disk.

For example, in the currently available data block group, if m check data blocks are arranged at the end of n user data blocks, then the m check nodes are arranged at the end of the n data nodes in the linked list. Consequently, m check nodes correspond to m check data blocks one by one, and n data nodes correspond to n user data blocks one by one, facilitating the writing of data from the memory to the disk. That is, the data in each node of the linked list is written into the corresponding data block.

In one embodiment, arranging n data nodes and m check nodes into a linked list according to the arrangement sequence, comprises: arranging the m check nodes at the end of the n data nodes to obtain a linked list.

It is evident that in the embodiments, the EC algorithm is used for data reliability protection in solid state disks. Since the number of check data blocks (m) in the EC algorithm is configurable, the present disclosure can tolerate 1, 2, 3, or even more DIE faults in the disk, so that data is not easily lost. This approach offers sufficient flexibility and is suitable for protecting large-capacity storage disks. Moreover, in the embodiments, the data is correspondingly flushed into the disk according to the arrangement sequence of n user data blocks and m check data blocks in the currently available data block group. This can ensure the randomness of check data across the disk, that is, make it possible for each DIE in the disk to store the check data, thus further protecting data from being lost.

Based on the embodiments mentioned above, it should be noted that the m memory nodes for storing the check data need to be requested additionally from the memory. This requesting action can be executed by the solid state disk or by the EC algorithm engine.

Therefore, in one embodiment, computing the check data for the target data by using an EC algorithm engine and storing the check data by using m memory nodes, comprises:

the solid state disk requesting m memory nodes from the memory and transferring n data nodes and m memory nodes to the EC algorithm engine to allow the EC algorithm engine to compute the check data based on the n data nodes and write the check data into the m memory nodes; or the solid state disk transferring n data nodes to the EC algorithm engine to allow the EC algorithm engine to compute the check data based on the n data nodes; the EC algorithm engine requesting m memory nodes from the memory and then writing the check data into the m memory nodes.

Based on the embodiments mentioned above, it should be noted that after storing the target data, the method further comprises: updating the L2P mapping table and releasing n data nodes and m check nodes to release memory space on the solid state disk.

The L2P mapping table is a table for recording the mapping relationship between logical block address and physical block address. For specific details, refer to the related art.

Based on the embodiments mentioned above, it should be noted that if the data writing fails in any node within the linked list (i.e., any of the n data nodes or m check nodes), the following steps are performed: determining a currently available data block group and querying the arrangement sequence of n user data blocks and m check data blocks in the data block group; arranging n data nodes and m check nodes into a linked list according to the arrangement sequence; and writing, based on the linked list, data from the n data nodes correspondingly into the n user data blocks and data from the m check nodes correspondingly into the m check data blocks to store the target data. That is, find another available data block group to complete the writing of the target data. Each data block in the data block group originally used for writing the target data can be recycled using the garbage collection mechanism of the solid state disk.

Finding another available data block group involves the following two scenarios:

Scenario One: A currently available data block group can be directly used. In this case, the following steps are performed: directly selecting a currently available data block group and querying the arrangement sequence of n user data blocks and m check data blocks in the data block group; arranging n data nodes and m check nodes into a linked list according to the arrangement sequence; and writing, based on the linked list, data from the n data nodes correspondingly into the n user data blocks and data from the m check nodes correspondingly into the m check data blocks to store the target data.

Scenario Two: No available data block group can be directly used. In this case, a new data block group needs to be constructed. Then the process of constructing a new data block group comprises:

calculating the sum of n and m to obtain the target value;

selecting, in the case that the target value is equal to the number of DIEs in the current solid state disk, one data block from each DIE in the current solid state disk, or selecting, in the case that the target value is fewer than the number of DIEs in the current solid state disk, the target value number of DIEs in the current solid state disk and one data block from each of the selected DIEs; and marking n user data blocks and m check data blocks in the target value number of data blocks, and determining the arrangement sequence of the n user data blocks and the m check data blocks to obtain a currently available data block group.

In one embodiment, marking n user data blocks and m check data blocks in the target value number of data blocks comprises: randomly selecting m data blocks in the target value number of data blocks to mark them as check data blocks, and marking the remaining n data blocks as user data blocks.

In one embodiment, marking n user data blocks and m check data blocks in the target value number of data blocks comprises: randomly arranging the target value number of data blocks based on the identification information of the DIE to which each data block belongs to obtain a target sequence; and marking m consecutive data blocks in the target sequence as check data blocks, and marking the remaining n data blocks as user data blocks.

Based on the embodiments mentioned above, it should be noted that in the case that the target data occupies fewer than n memory nodes in the memory, it waits to receive new data sent by the host, so as to supplement the target data with the new data and ensure the target data occupies n memory nodes in the memory. If the target data occupies more than n memory nodes after being supplemented with the new data, S102 to S106 are performed for the first n memory nodes. The remaining memory nodes continue to wait for the new supplemental data sent by the host. That is, S102-S106 are performed as long as there are sufficient n memory nodes holding data.

In the case that waiting for new data times out, the target data is supplemented with all-zero data to ensure the target data occupies n memory nodes in the memory, and the following steps are performed: determining the n memory nodes as n data nodes; computing the check data for the target data by using an EC algorithm engine, storing the check data by using m memory nodes, and then determining the m memory nodes as m check nodes, wherein the values of n and m are preset in the EC attributes of the current solid state disk; determining a currently available data block groups and querying the arrangement sequence of n user data blocks and m check data blocks in the data block group; arranging the n data nodes and the m check nodes into a linked list according to the arrangement sequence; and writing, based on the linked list, data from the n data nodes correspondingly into the n user data blocks and data from the m check nodes correspondingly into the m check data blocks to store the target data.

It should be noted that all-zero data refers to meaningless data. Although these all-zero data participate in the computation of check data, their corresponding physical addresses are not recorded in the L2P mapping table during the actual flush in the disk, such that no read operations hit them.

Based on the embodiments mentioned above, it should be noted that the process of configuring the EC attributes of the current solid state disk comprises:

receiving a command sent by the host to configure the EC attributes;

parsing the command to obtain a target value and m, wherein the target value is the sum of n and m;

recording, in the case that the target value is not greater than the number of DIEs in the current solid state disk, the difference between the target value and m as n; transferring n and m to the EC algorithm engine to allow the EC algorithm engine to determine the encoding matrix based on n and m to configure the EC attributes of the current solid state disk; and returning, in the case that the target value is greater than the number of DIEs in the current solid state disk, a notification message that the EC attribute configuration has failed.

It is evident that the target value and m can be flexibly configured based on the number of DIEs in the disk, that is, m can take values such as 1, 2, 3 (preferred), 4, etc. Therefore, 1, 2, 3, or even more DIE faults in the disk can be tolerated, so that data is not easily lost. This approach offers sufficient flexibility and is suitable for protecting large-capacity storage disks.

Based on the embodiments mentioned above, it should be noted that the method further comprises:

querying, in the case that the first read of the target data fails, which indicates that several data blocks in the data block group for storing the target data are in fault, the data block group; selecting n data blocks which can be read properly from the data block group to form a recoverable combination without repetitions; reading data from each data block in the recoverable combination, and transferring the read data to the EC algorithm engine to allow the EC algorithm to decode the read data to obtain a decoding result; checking the decoding result, and reading, in the case that the check is successful, the target data based on the decoding result, and returning the recovered data to the disclosure that initiated the read request, otherwise, performing the step of selecting n data blocks which can be read properly from the data block group to form a recoverable combination without repetitions; and returning, in the case that a recoverable combination without repetitions cannot be selected from the data block group, a notification message that the target data reading has failed.

It is evident that as long as there are any n data blocks in a data block group which can be read properly, the data to be read can be recovered, protecting data from being lost.

The following will describe a data processing apparatus according to the embodiments of the present disclosure, and the data processing apparatus described below and the data processing method described above may be referred to with each other.

Figure 3:
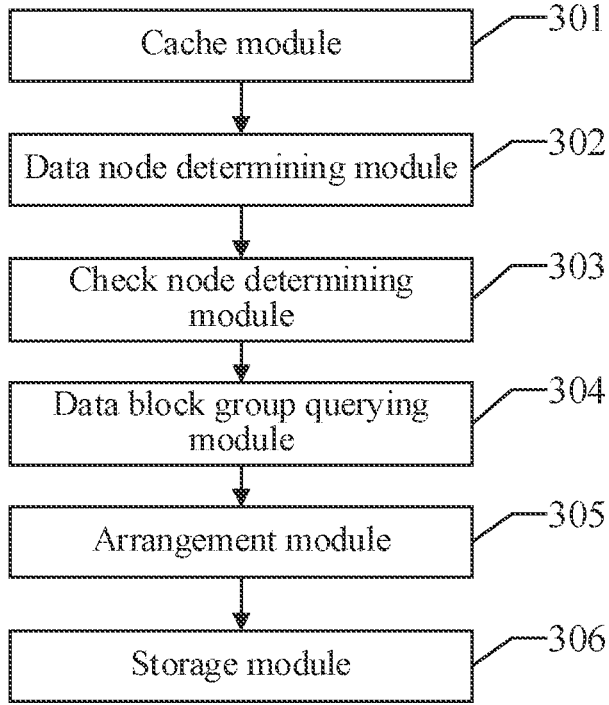
FIG. 3 is a schematic diagram of a data processing apparatus disclosed in the present disclosure.

Referring to FIG. 3, embodiments of the present disclosure disclose a data processing apparatus applicable to a solid state disk. The data processing apparatus comprises:

a cache module 301 configured to receive target data sent by the host and write the target data into a memory;

a data node determining module 302 configured to determine, in the case that the target data occupies n memory nodes in the memory, the n memory nodes as n data nodes;

a check node determining module 303 configured to compute the check data for the target data by using an EC algorithm engine, store the check data by using m memory nodes, and then determine the m memory nodes as m check nodes, wherein the values of n and m are preset in the EC attributes of the current solid state disk;

a data block group querying module 304 configured to determine a currently available data block group and query the arrangement sequence of n user data blocks and m check data blocks in the data block group;

an arrangement module 305 configured to arrange the n data nodes and the m check nodes into a linked list according to the arrangement sequence; and a storage module 306 configured to write, based on the linked list, data from the n data nodes correspondingly into the n user data blocks and data from the m check nodes correspondingly into the m check data blocks to store the target data.

In one embodiment, the check node determining module is configured to:

request m memory nodes from the memory;

transfer n data nodes and m memory nodes to the EC algorithm engine to allow the EC algorithm engine to compute the check data based on the n data nodes and write the check data into the m memory nodes; or transfer n data nodes to the EC algorithm engine to allow the EC algorithm engine to compute the check data based on the n data nodes, request m memory nodes from the memory, and then write the check data into the m memory nodes.

In one embodiment, the arrangement module is configured to:

arrange m check nodes at the end of n data nodes to obtain a linked list.

In one embodiment, the apparatus further comprises:

an execution module configured to update the L2P mapping table and release n data nodes and m check nodes.

In one embodiment, the apparatus further comprises:

a reselection module configured to perform, in the case that the data writing fails in any node within the linked list, the step of determining a currently available data block group.

In one embodiment, the data block group querying module comprises: a construction unit.

The construction unit comprises:

a calculation subunit configured to calculate, in the case that there is no currently available data block group, the sum of n and m to obtain a target value;

a selection subunit configured to select, in the case that the target value is equal to the number of DIEs in the current solid state disk, one data block from each DIE in the current solid state disk, or select, in the case that the target value is fewer than the number of DIEs in the current solid state disk, the target value number of DIEs in the current solid state disk and one data block from each of the selected DIEs; and a marking subunit configured to mark n user data blocks and m check data blocks in the target value number of data blocks, and determine the arrangement sequence of the n user data blocks and the m check data blocks to obtain a currently available data block group.

In one embodiment, the marking subunit is configured to:

randomly select m data blocks in the target value number of data blocks to mark the m as check data blocks, and mark the remaining n data blocks as user data blocks.

In one embodiment, the marking subunit is configured to:

randomly arrange the target value number of data blocks based on the identification information of the DIE to which each data block belongs to obtain a target sequence; and mark m consecutive data blocks in the target sequence as check data blocks, and mark the remaining n data blocks as user data blocks.

In one embodiment, the data block group querying module comprises: a selection unit.

The selection unit is configured to:

perform, in the case that there is a currently available data block group, the step of querying the arrangement sequence of n user data blocks and m check data blocks in the data block group.

In one embodiment, the apparatus further comprises:

a waiting module configured to wait, in the case that the target data occupies fewer than n memory nodes in the memory, to receive new data sent by the host, so as to supplement the target data with the new data and ensure the target data occupies n memory nodes in the memory.

In one embodiment, the apparatus further comprises:

a timeout module configured to supplement, in the case that waiting for new data times out, the target data with all-zero data to ensure the target data occupies n memory nodes in the memory, and perform the step of determining the n memory nodes as n data nodes.

In one embodiment, the apparatus further comprises a configuration module configured to configure the EC attributes of the current solid state disk. The configuration module comprises:

a receiving unit configured to receive a command sent by the host to configure the EC attributes;

a parsing unit configured to parse the command to obtain a target value and m, wherein the target value is the sum of n and m;

a calculation unit configured to record, in the case that the target value is not greater than the number of DIEs in the current solid state disk, the difference between the target value and m as n; and a configuration unit configured to transfer n and m to the EC algorithm engine to allow the EC algorithm engine to determine the encoding matrix based on n and m to configure the EC attributes of the current solid state disk.

In one embodiment, the configuration module further comprises:

a notification unit configured to return, in the case that the target value is greater than the number of DIEs in the current solid state disk, a notification message that the EC attribute configuration has failed.

In one embodiment, the apparatus further comprises a read module, which is configured to:

query, in the case that the first read of the target data fails, the data block group;

select n data blocks which can be read properly from the data block group to form a recoverable combination without repetitions;

read data from each data block in the recoverable combination, and transfer the read data to the EC algorithm engine to allow the EC algorithm to decode the read data to obtain a decoding result;

check the decoding result, and read, in the case that the check is successful, the target data based on the decoding result, otherwise, perform the step of selecting n data blocks which can be read properly from the data block group to form a recoverable combination without repetitions; and return, in the case that a recoverable combination without repetitions cannot be selected from the data block group, a notification message that the target data reading has failed.

For more specific operation processes of each module and unit in the embodiments, reference may be made to corresponding contents disclosed in the foregoing embodiments, and details are not described herein again.

It is evident that a data processing apparatus is provided in the embodiments. The apparatus can tolerate 1, 2, 3, or even more DIE faults in the disk, so that data is not easily lost. The apparatus possesses sufficient flexibility and is suitable for protecting large-capacity storage disks. Moreover, the apparatus can ensure the randomness of check data across the disk, that is, allow each DIE in the disk to potentially store check data, thus further protecting data from being lost.

The following will describe an electronic device according to the embodiments of the present disclosure, and the electronic device described below and the data processing method and apparatus described above may be referred to with each other.

Figure 4:
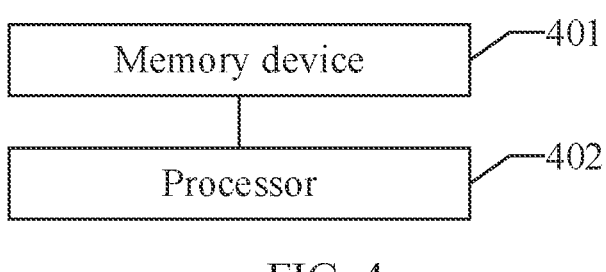
FIG. 4 is a schematic diagram of an electronic device disclosed in the present disclosure.

Referring to FIG. 4, embodiments of the present disclosure disclose an electronic device.

The electronic device comprises:

a memory 401 configured to store computer programs; and a processor 402 configured to run the computer programs to implement the method disclosed by any of the embodiments described above.

The following will describe a readable storage medium according to the embodiments of the present disclosure, and the readable storage medium described below and the data processing method and apparatus and the device described above may be referred to with each other.

Provided is a readable storage medium for storing computer programs, wherein the computer programs, when run by a processor, cause the processor to implement the data processing method disclosed in the foregoing embodiments. For the specific steps of the method, reference may be made to corresponding contents disclosed in the foregoing embodiments, and details are not described herein again.

According to the solutions provided by the present disclosure, the following embodiments can be designed and implemented.

1. Configure the EC Attributes of the Solid State Disk.

Create a namespace based on the solid state disk or configure and modify EC attributes when the namespace does not contain data. Namespace represents the range of storage space visible to an identifier. One solid state disk can create a plurality of namespaces. The EC attributes of different namespaces can be different.

Generally, if one check block is set, the EC attribute is recorded as EC-1; similarly, if three Check blocks are set, the EC attribute is recorded as EC-3, and so on. The stripe size (the total number of data blocks in a data block group) can be configured to 32 or other numbers, and the stripe size only needs to not exceed the total number of DIEs in the solid state disk.

Figure 5:
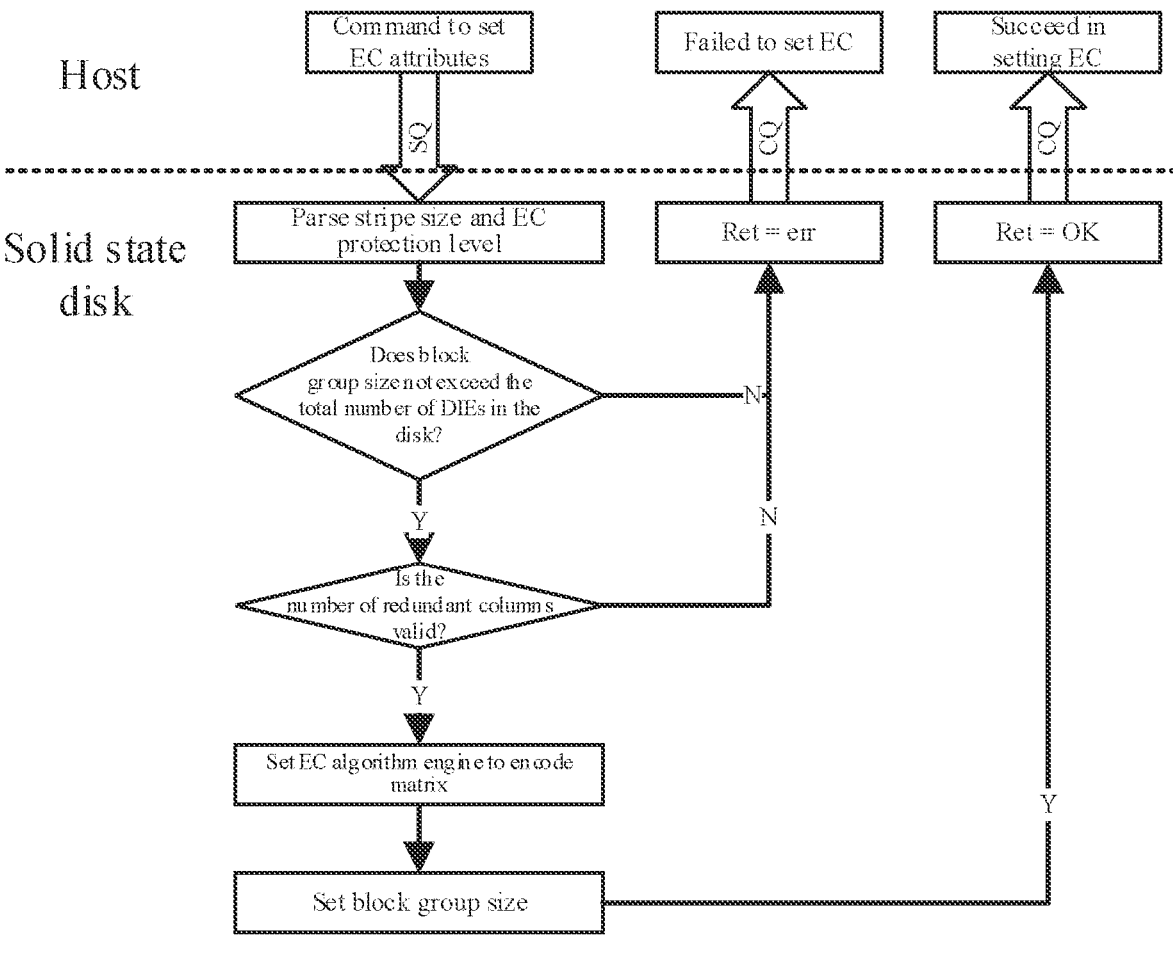
FIG. 5 is a flowchart illustrating the process of configuring the EC attributes of a solid state disk disclosed in the present disclosure.

Referring to FIG. 5, the host configures EC attributes through the VU command. The host modifies or specifies the EC attribute of a namespace by issuing the VU command. The VU command is generally considered to be a command line interface (CLI), which is a standard set of command lines in Linux systems.

After the solid state disk receives the command to configure EC attributes, it will first check the validity of the parameters. That is, determine whether the number of DIEs in the disk is greater than or equal to the block group size (i.e., the total number of data blocks in a data block group, which is the sum of n and m specified in the command). If the number of DIEs in the disk is fewer than the block group size, parameter configuration failure will be returned to the host. If the number of DIEs in the disk is greater than or equal to the block group size, determine whether the number of redundant columns (i.e., the value of m) specified in the command meets the requirements (generally, the value of m may be 3). It is evident that the validity check of parameters is to check the value of m specified in the command (i.e., the EC protection level in FIG. 5), and whether the block group size meets the preset requirement.

If the parameter check fails, parameter configuration failure will be returned to the host, and the namespace will be set as unable to accept IO. If the parameter check is successful, the number of redundant columns of the EC algorithm engine will be set to generate an encoding matrix, and then the size and composition structure of the block group, the sequence of data blocks, etc. will be set based on the parameters specified in the command. At this point, the read and write operations can commence.

If the number of DIEs in the disk is fewer than the size of the block group, it does not comply with the rule that all blocks in the block group are distributed across different DIEs. In this scenario, one block group may take out two blocks from a certain DIE. If this DIE fails, it will affect the data in the two blocks and easily lose the data, which is against the data protection principle of the EC algorithm. Therefore, the number of DIEs in the disk needs to be greater than or equal to the block group size.

2. Set Up a Block Group.

Referring to FIG. 2, assuming p≥32, based on the rule that all blocks in the block group are distributed across different DIEs, blocks from 32 (n+m=32) DIEs are selected to form a block group, where, n represents the number of blocks used to store user data, and m represents the number of blocks used to store check data.

If the number of redundant columns is set to 1 (i.e., m=1), then n=31, and the EC attribute is recorded as EC-1. If the number of redundant columns is set to 2 (i.e., m=2), then n=30, and the EC attribute is recorded as EC-2. The higher the value of m is set, the faultier blocks can be tolerated at a time within one block group, making the data less prone to loss. However, there is also a disadvantage that within one block group, the number of check data stored exceeds the number of user data, resulting in reduced hard disk space utilization. Hard disk space utilization=n/(m+n).

Figure 6:
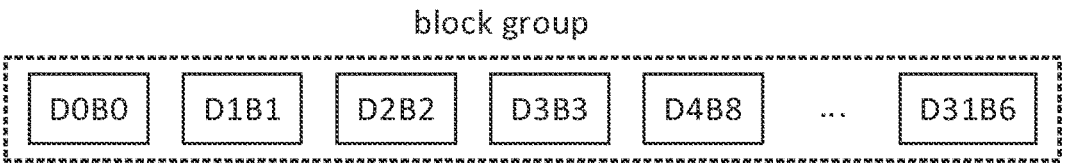
FIG. 6 is a schematic diagram of a block group disclosed in the present disclosure.

Assume that a total of 32 DIEs, i.e., DIE0 to DIE31, are selected from DIE0 to DIEp shown in FIG. 2, and one block is selected from each of the 32 DIEs. Then the block group shown in FIG. 6 can be obtained. In FIG. 6, D0B0 represents block0 on DIE0, D1B1 represents block1 on DIE1, and so on.

For the sake of system performance and reliability, m check blocks in a block group are distributed across different DIEs. Doing so will bring two benefits:

1. User data and check data are stored on each DIE, as a result, each DIE is potentially to be read in a reading scenario, avoiding the situation where some DIEs are idle all the time.

2. The number of reads for each DIE will tend to approach an average value, resulting in a relatively consistent lifespan for all blocks.

Taking EC-2 as an example, any two blocks from a block group are taken to store the check data, such as D0B0 and D4B8 in FIG. 6. In this case, additional metadata is required to record which blocks in this block group are check blocks, which can lead to excessive metadata and inconvenience in management.

In order to better manage the distribution of check data blocks, it is specified that the last m blocks in a block group are used to store check data. For example, in the case of EC-2, the last two blocks in a block group are the EC-2 check data blocks.

However, in order to ensure that the check data blocks in different block groups are distributed across different DIEs, the sequence of all blocks in the block groups is randomized. After the randomization, the last m check data blocks in different block groups will be randomly distributed across different DIEs, thereby enhancing disk performance.

Figure 7:
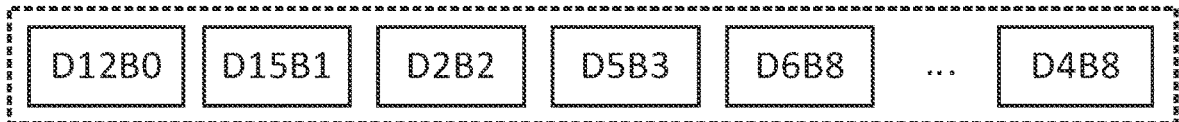
FIG. 7 is a schematic diagram of the block group shown in FIG. 6, where each data block within the block group has been disordered randomly.

Randomization of each block in the block group shown in FIG. 6 leads to the block group shown in FIG. 7. It is specified that the last m blocks in the block group shown in FIG. 7 are used to store check data. Assuming that for the block group shown in FIG. 7, the EC attribute is EC-2, n+m=32, then the first 30 blocks store user data, and the last 2 blocks store check data.

3. Data Writing Process.

It is agreed in the SSD system that the size of each write request sent by the cache is fixed to the size of one wordline (i.e., the size of one memory node). The memory nodes occupied by each write request are organized together in the form of a linked list. When the number of nodes in the linked list reaches n, no new nodes will be added to the linked list.

If the number of nodes in the linked list does not reach n, keep waiting for the arrival of subsequent IO; if it takes more than 10 s and n nodes have not been gathered, then request a certain amount of all-zero data nodes to complete the set of n nodes.

Figure 8:
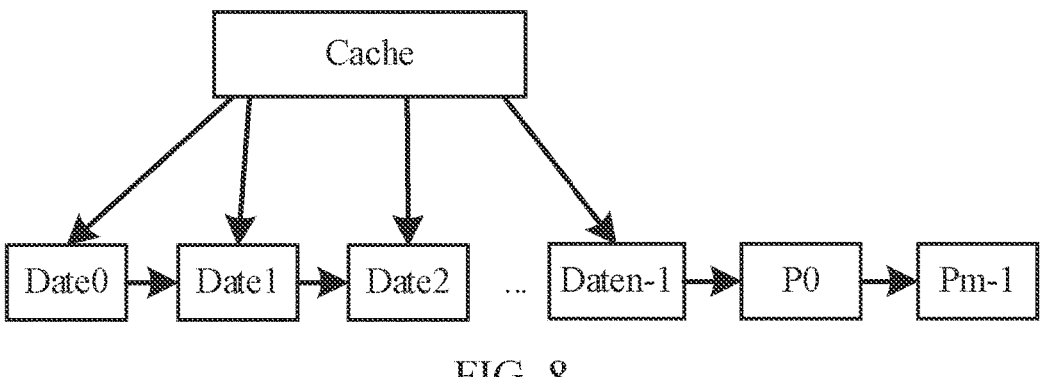
FIG. 8 is a schematic diagram of a linked list disclosed in the present disclosure.

As shown in FIG. 8, after the number of nodes in the linked list reaches n, m memory nodes are added to the end of the linked list. Then all nodes on the linked list are passed to the EC algorithm engine to allow the EC algorithm engine to compute and obtain the check data and then write the check data into the m memory nodes. The m memory nodes are P0 to Pm−1 in FIG. 8. In FIG. 8, Date0 to Daten−1 are memory nodes occupied by the data received from the cache for writing, and P0 to Pm−1 are the check data obtained by encoding all data in Date0 to Daten−1 by the EC algorithm.

After obtaining the linked list as shown in FIG. 8, the data on each node in the linked list will be written into each block in the currently available block group, thereby completing the write operation. The data in Date0 to Daten−1 is written into the user data block in the block group, and the data in P0 to Pm−1 is written into the check data block in the block group.

If there is no currently available block group or the data writing fails in any node within the linked list, a new block group needs to be constructed. For the construction method, refer to the relevant introduction in "Set up a block group" above.

Only when the data in all nodes on the linked list is completely written, the L2P mapping table is updated, and then the corresponding memory nodes are released. That is, every node in the linked list shown in FIG. 8 is released. The memory nodes used to store the check data are additionally requested in the writing process, so it is necessary to add a step of releasing the memory nodes. The memory nodes used to store user data automatically remove dirty data nodes during cache callback, eliminating the need for an additional step to release these memory nodes.

The corresponding physical addresses in the L2P mapping table are composed as follows:

```
typedef struct{
    uint32_t bgId : 12;
    uint32_t dieId : 9;
    uint32_t pageId : 11;
    uint16_t blockId : 13;
    uint16_t auOff : 3;
} physicalAddr_t;
``` wherein, bgId represents the Id of the block group, dieId and blockId represent the Id of a real DIE where a block in the block group is located and the Id of the block, pageId represents the page number on the Id of the block where the data is located, and auOff represents the AU in the page the data falls on. A page contains a plurality of AUs.

After each LBA is written, the physical address corresponding to the LBA is updated according to the above physicalAddr_t to form an L2P mapping table.

Figure 9:
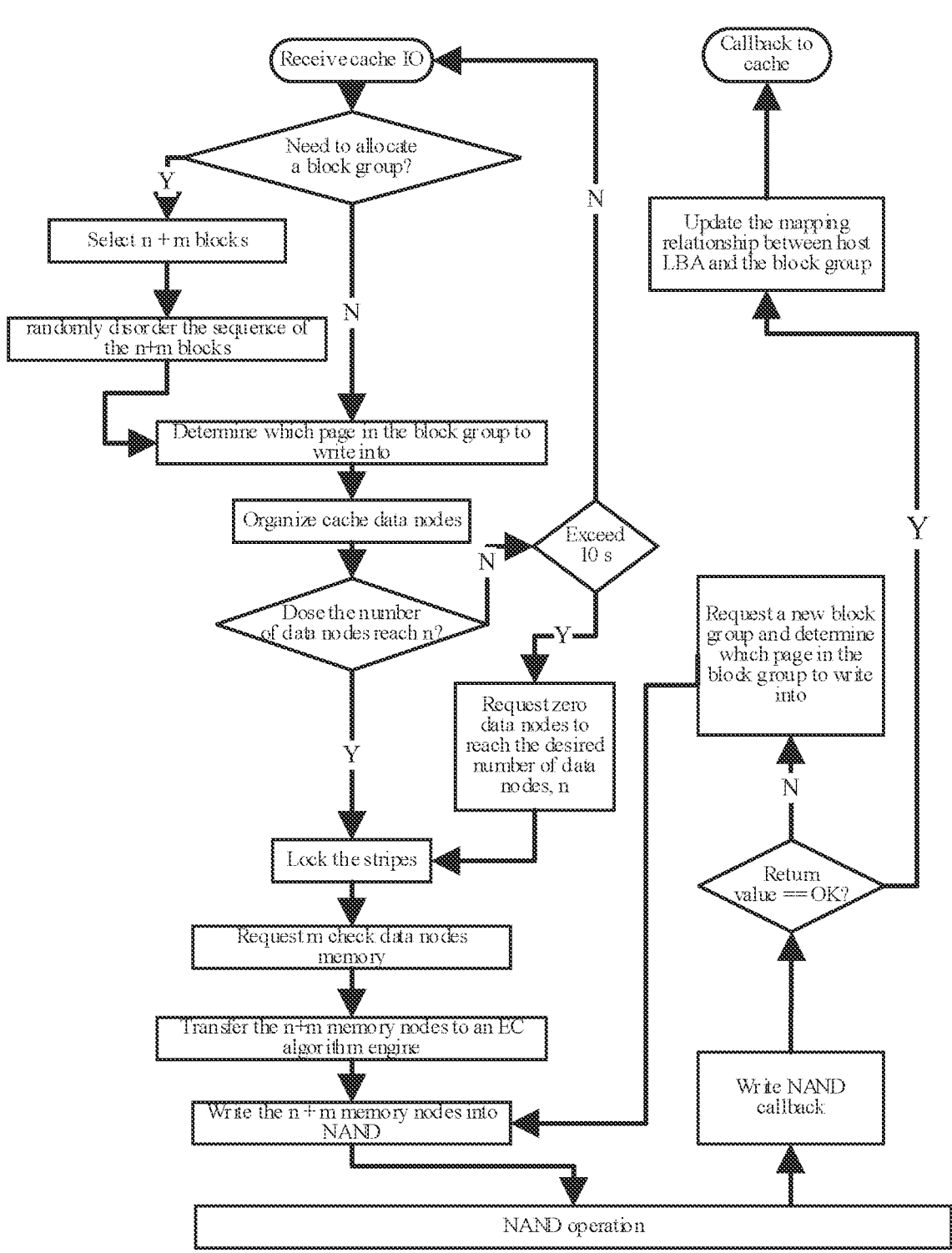
FIG. 9 is a writing process flowchart disclosed in the present disclosure.

Based on the above, the flowchart of the write IO process is shown in FIG. 9. In the write IO process, after receiving the cache data, it is determined whether a new block group needs to be allocated. The determination is based on querying whether there is a currently available block group for writing user data. Therefore, a new block group needs to be allocated only when a block group of the system is full. For the rules for allocating block groups, refer to the relevant introduction in "Set up a block group" above.

If there is an available block group, it will be known which block group the data should be written to. Then, the linked list is prepared, and the data in each node within the prepared linked list is written sequentially into the respective data blocks in the block group.

The data in one node within the linked list is written into one page in a data block. When the writing of each node in the linked list is completed, the next linked list will be written into the next page of the corresponding data block of the block group. For example: There are two data blocks in the block group, and both data blocks comprise ten pages. When the block group is used for the first time, data will be written into the first page of the two data blocks. When the block group is used next time, data will be written into the second page of the two data blocks, that is, the page identifier is incremented by one.

4. Data Reading Process.

Since only n blocks in a block group store user data, only n blocks in a block group work in a reading scenario (m check data blocks do not need to be read in the scenario where there is no read failure).

Figure 10:
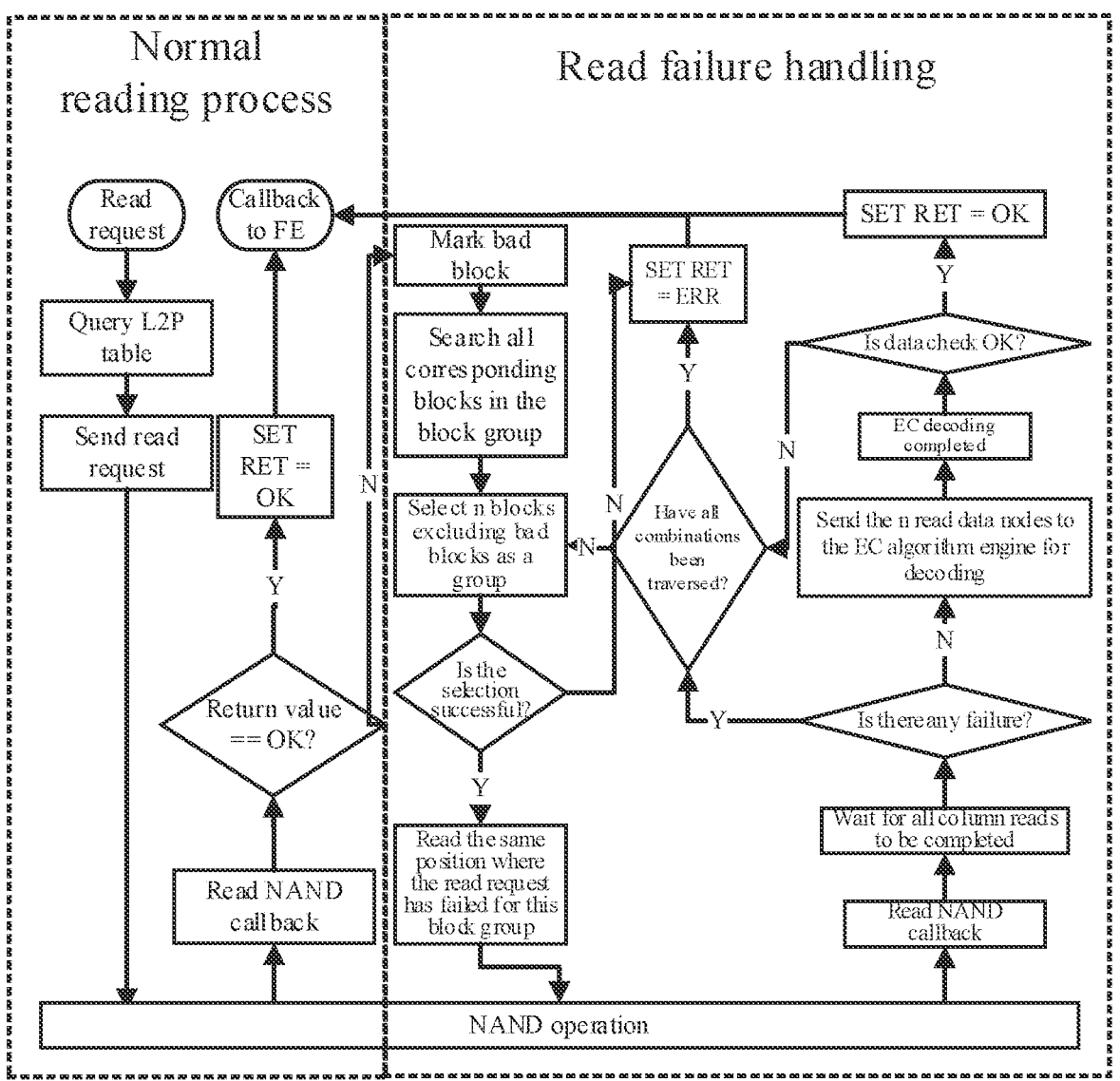
FIG. 10 is a reading process flowchart disclosed in the present disclosure.

Referring to FIG. 10, the process of reading data is the reverse of that of writing data. By querying the corresponding L2P mapping table, the corresponding location of the data to be read on the corresponding block in the corresponding block group can be obtained. Then, a read operation is sent to the NAND FLASH, and if there is no exception in the NAND, the read data is directly returned to the caller.

If a read failure occurs during the process of reading NAND, it is necessary to determine the n blocks (including check blocks) within the block group to which the data to be read belongs. Based on the n blocks, the correct user data can be restored.

If the read fails, the block that failed to read is marked as a bad block, and all blocks in the block group to which the block belongs are queried. N blocks are selected from the block group (excluding the block that failed to read).

If n blocks cannot be selected from the block group, a read failure will be directly returned to the front end. The EC recovery fails, and the process ends.

If n blocks can be selected from the block group, the data in the n blocks will be read. If all n blocks are successfully read, all successfully read data will be sent to the EC algorithm engine for decoding; otherwise, another n blocks will be selected again for re-reading.

After the EC algorithm engine completes decoding, the data consistency check is performed on the obtained data. If the check is successful, the return value is set to OK and returned to the front end. The EC recovery succeeds, and the process ends. If the check fails, another n blocks are selected again for re-reading.

If n blocks can no longer be selected for re-reading in the block group, the return value is set to err and returned to the front end. EC recovery fails, and the process ends.

It is evident that the embodiment can configure different EC levels according to user requirements, effectively providing flexible data reliability protection levels for different user scenarios, and having very high flexibility and configurability. It can allow for more DIE failures, provide higher reliability, and can greatly enhance the performance and lifespan of SSDs.

The terms "first", "second", "third", "fourth", etc. (if present) used herein are used to distinguish similar objects, and do not have to be used to describe a specific order or sequence. It should be understood that the data so used is interchangeable under appropriate circumstances such that the embodiments described herein are capable of implementation in other sequences than those illustrated or described herein. Moreover, the terms "comprise" and "have" and any variations thereof are intended to cover non-exclusive inclusion. For example, a process, method, or device comprising a series of steps or units is not necessarily limited to the explicitly listed steps or units, but may comprise other steps or units that are not explicitly listed or are inherent in the process, method, or device.

It should be noted that the terms "first" and "second" herein are used for descriptive purposes only and are not to be construed as indicating or implying relative importance or to implicitly indicate the number of technical features indicated. From this, features defined as "first" and "second" may explicitly or implicitly include at least one feature. In addition, technical solutions of different embodiments may be combined, which, however, must be on the basis that they can be realized by one skilled in the art, and when the technical solutions in a combination are contradictory to each other or the combination cannot be realized, such combination should be considered inexistent, and is out of the protection scope of the present disclosure.

The embodiments in the specification are all described in a progressive manner, and each embodiment focuses on differences from other embodiments, and portions that are the same and similar between the embodiments may be referred to each other.

The steps of the method or algorithm described in connection with the embodiments disclosed herein may be implemented directly through hardware, software modules executed by processors, or their combination. The software modules can be stored in random access memory (RAM), memory, read-only memory (ROM), electrically programmable ROM, electrically erasable programmable ROM, registers, hard disks, removable disks, CD-ROMs, or any other form of readable storage medium known in the art.

Embodiments are used herein to illustrate the principles and implementations of the present disclosure, and the descriptions of the above embodiments are only used to help understand the method of the present disclosure and the core idea of the method. Meanwhile, for those of ordinary skill in the art, the idea of the present disclosure will have changes in the implementations and disclosure scope. To sum up, the content of this specification should not be construed as a limitation on the present disclosure.

The invention claimed is:

1. A method for data processing applicable to a solid state disk, comprising:

receiving target data sent by a host, and writing the target data into n memory nodes in a memory;

determining the n memory nodes to be n data nodes;

computing check data of the target data by using an erasure code (EC) algorithm engine, storing the check data in m memory nodes of the memory, and determining the m memory nodes to be m check nodes, wherein values of n and m are configured in EC attributes of the solid state disk with the value of m being configured based on a number of DIEs in the solid state disk, wherein the memory includes the n data nodes that store the target data and the m check nodes that store the check data with each of the n data nodes and the m check nodes having a size of a minimum unit for data writing of the solid state disk;

determining a first data block group from the solid state disk, and querying an arrangement sequence of n user data blocks and m check data blocks in the first data block group;

arranging the n data nodes and the m check nodes of the memory into a linked list according to the arrangement sequence;

writing, based on the linked list, data from the n data nodes into the n user data blocks, respectively, and data from the m check nodes into the m check data blocks, respectively, to store the target data; and when data writing fails in a node within the linked list, determining a second data block group that is different from the first data block group from the solid state disk, comprising:

determining a target number of data blocks in the solid state disk, wherein the target number is equal to a sum of n and m, and each data block in the target number of data blocks is from a different DIE in the solid state disk;

based on identification information of each DIE to which a respective data block belongs, randomly arranging the target number of data blocks to obtain a target sequence; and marking m consecutive data blocks in the target sequence to be the m check data blocks, and marking remaining n data blocks in the target sequence to be the n user data blocks.

2. The method according to claim 1, wherein computing the check data for the target data by using the EC algorithm engine and storing the check data in the m memory nodes of the memory comprises:

requesting the m memory nodes from the memory;

transferring the n data nodes and the m memory nodes to the EC algorithm engine to allow the EC algorithm engine to compute the check data based on the n data nodes and write the check data into the m memory nodes; or transferring the n data nodes to the EC algorithm engine to allow the EC algorithm engine to compute the check data based on the n data nodes, request the m memory nodes from the memory, and write the check data into the m memory nodes.

3. The method according to claim 1, wherein arranging the n data nodes and the m check nodes of the memory into the linked list according to the arrangement sequence comprises:

responsive to the m check data blocks being arranged at the end of the n user data blocks, arranging the m check nodes at the end of the n data nodes to obtain the linked list.

4. The method according to claim 1, wherein after storing the target data, the method further comprises:

updating a logical to physical (L2P) mapping table and releasing the n data nodes and the m check nodes from the memory.

5. The method according to claim 1, wherein the step of determining the second data block group further comprises:

when there is no currently available data block group, calculating the sum of n and m to obtain the target number;

when the target number is equal to the number of DIEs in the solid state disk, selecting one data block from each DIE in the solid state disk to obtain the target number of data blocks, or when the target number is smaller than the number of DIEs in the solid state disk, selecting the target number of DIEs in the solid state disk and selecting one data block from each of the selected target number of DIEs to obtain the target number of data blocks; and marking the n user data blocks and the m check data blocks in the target number of data blocks, and determining an arrangement sequence of the n user data blocks and the m check data blocks to obtain the second data block group.

6. The method according to claim 5, wherein marking the n user data blocks and the m check data blocks in the target number of data blocks comprises:

randomly selecting m data blocks in the target number of data blocks to mark the m data blocks to be the m check data blocks, and marking remaining n data blocks in the target number of data blocks to be the n user data blocks.

7. The method according to claim 1, further comprising:

when there is a currently available data block group, selecting the currently available data block group to be the second data block group, and querying the arrangement sequence of the n user data blocks and the m check data blocks in the second data block group.

8. The method according to claim 1, further comprising:

when a number of memory nodes occupied by the target data is smaller than n, waiting to receive new data sent by the host, so as to supplement the target data with the new data and ensure that the target data occupies the n memory nodes in the memory.

9. The method according to claim 7, further comprising:

when the waiting for the new data times out, supplementing the target data with all-zero data to ensure the target data occupies the n memory nodes in the memory, and performing a step of determining the n memory nodes to be n data nodes.

10. The method according to claim 1, further comprising configuring the EC attributes of the solid state disk at least by:

receiving a command sent by the host to configure the EC attributes;

parsing the command to obtain the target number and m;

when the target number is not greater than the number of DIEs in the solid state disk, recording a difference between the target number and m as n; and transferring n and m to the EC algorithm engine to allow the EC algorithm engine to determine an encoding matrix based on n and m to configure the EC attributes of the solid state disk.

11. The method according to claim 10, further comprising:

when the target number is greater than the number of DIEs in the solid state disk, returning a notification message indicating that EC attribute configuration has failed.

12. The method according to claim 1, further comprising:

when a first read of the target data fails, querying the first data block group;

performing a step of selecting n data blocks read properly from the first data block group to form a recoverable combination without repetitions;

reading data from each data block in the recoverable combination, and transferring the read data to the EC algorithm engine to allow the EC algorithm to decode the read data to obtain a decoding result;

checking the decoding result, and when the check is successful, reading the target data based on the decoding result, otherwise, returning to the step of selecting n data blocks read properly from the first data block group to form the recoverable combination without repetitions; and when no recoverable combination without repetitions is available to be selected from the first data block group, returning a notification message indicating that the reading of the target data has failed.

13. An electronic device, comprising:

a memory device configured to store computer programs; and a processor configured to run the computer programs to implement operations comprising:

receiving target data sent by a host, and writing the target data into n memory nodes in a memory;

determining the n memory nodes to be n data nodes;

computing check data of the target data by using an erasure code (EC) algorithm engine, storing the check data in m memory nodes of the memory, and determining the m memory nodes to be m check nodes, wherein values of n and m are configured in EC attributes of a solid state disk with the value of m being configured based on a number of DIEs in the solid state disk, wherein the memory includes the n data nodes that store the target data and the m check nodes that store the check data with each of the n data nodes and the m check nodes having a size of a minimum unit for data writing of the solid state disk;

determining a first data block group from the solid state disk, and querying an arrangement sequence of n user data blocks and m check data blocks in the first data block group;

arranging the n data nodes and the m check nodes of the memory into a linked list according to the arrangement sequence;

writing, based on the linked list, data from the n data nodes into the n user data blocks, respectively, and data from the m check nodes into the m check data blocks, respectively, to store the target data; and when data writing fails in a node within the linked list, determining a second data block group that is different from the first data block group from the solid state disk, comprising:

determining a target number of data blocks in the solid state disk, wherein the target number is equal to a sum of n and m, and each data block in the target number of data blocks is from a different DIE in the solid state disk;

based on identification information of each DIE to which a respective data block belongs, randomly arranging the target number of data blocks to obtain a target sequence; and marking m consecutive data blocks in the target sequence to be the m check data blocks, and marking remaining n data blocks in the target sequence to be the n user data blocks.

14. The electronic device according to claim 13, wherein computing the check data for the target data by using the EC algorithm engine and storing the check data in the m memory nodes of the memory comprises:

requesting the m memory nodes from the memory;

transferring the n data nodes and the m memory nodes to the EC algorithm engine to allow the EC algorithm engine to compute the check data based on the n data nodes and write the check data into the m memory nodes; or transferring the n data nodes to the EC algorithm engine to allow the EC algorithm engine to compute the check data based on the n data nodes, request the m memory nodes from the memory, and write the check data into the m memory nodes.

15. The electronic device according to claim 13, wherein arranging the n data nodes and the m check nodes of the memory into the linked list according to the arrangement sequence comprises:

responsive to the m check data blocks being arranged at the end of the n user data blocks, arranging the m check nodes at the end of the n data nodes to obtain the linked list.

16. The electronic device according to claim 13, wherein after storing the target data, the operations further comprise:

updating a logical to physical (L2P) mapping table and releasing the n data nodes and the m check nodes from the memory.

17. A non-transitory computer-readable storage medium storing computer programs, wherein the computer programs, when run by a processor, cause the processor to implement operations comprising:

receiving target data sent by a host, and writing the target data into n memory nodes in a memory;

determining the n memory nodes to be n data nodes;

computing check data of the target data by using an erasure code (EC) algorithm engine, storing the check data in m memory nodes of the memory, and determining the m memory nodes to be m check nodes, wherein values of n and m are configured in EC attributes of the solid state disk with the value of m being configured based on a number of DIEs in the solid state disk, wherein the memory includes the n data nodes that store the target data and the m check nodes that store the check data with each of the n data nodes and the m check nodes having a size of a minimum unit for data writing of the solid state disk;

determining a first data block group from the solid state disk, and querying an arrangement sequence of n user data blocks and m check data blocks in the first data block group;

arranging the n data nodes and the m check nodes of the memory into a linked list according to the arrangement sequence;

writing, based on the linked list, data from the n data nodes into the n user data blocks, respectively, and data from the m check nodes into the m check data blocks, respectively, to store the target data; and when data writing fails in a node within the linked list, determining a second data block group that is different from the first data block group from the solid state disk, comprising:

determining a target number of data blocks in the solid state disk, wherein the target number is equal to a sum of n and m, and each data block in the target number of data blocks is from a different DIE in the solid state disk;

based on identification information of each DIE to which a respective data block belongs, randomly arranging the target number of data blocks to obtain a target sequence; and marking m consecutive data blocks in the target sequence to be the m check data blocks, and marking remaining n data blocks in the target sequence to be the n user data blocks.

18. The non-transitory computer-readable storage medium according to claim 17, wherein computing the check data for the target data by using the EC algorithm engine and storing the check data in the m memory nodes of the memory comprises:

requesting the m memory nodes from the memory;

transferring the n data nodes and the m memory nodes to the EC algorithm engine to allow the EC algorithm engine to compute the check data based on the n data nodes and write the check data into the m memory nodes; or transferring the n data nodes to the EC algorithm engine to allow the EC algorithm engine to compute the check data based on the n data nodes, request the m memory nodes from the memory, and write the check data into the m memory nodes.

19. The non-transitory computer-readable storage medium according to claim 17, wherein arranging the n data nodes and the m check nodes of the memory into the linked list according to the arrangement sequence comprises:

responsive to the m check data blocks being arranged at the end of the n user data blocks, arranging the m check nodes at the end of the n data nodes to obtain the linked list.

20. The non-transitory computer-readable storage medium according to claim 17, wherein after storing the target data, the operations further comprise:

updating a logical to physical (L2P) mapping table and releasing the n data nodes and the m check nodes from the memory.

* * * * *